July 5, 1938.  S. W. BORDEN  2,122,548
GROUND TESTING METER
Filed Nov. 2, 1936

Inventor

Steffen W. Borden

Patented July 5, 1938

2,122,548

UNITED STATES PATENT OFFICE 2,122,548

GROUND TESTING METER

Stephen W. Borden, Summit, N. J.

Application November 2, 1936, Serial No. 108,818

5 Claims. (Cl. 175—183)

This invention relates to improvements in electrical measuring instruments and more particularly to that class of instruments which are used for measuring the resistance value of the surrounding earth through which a current must travel in passing from an earth electrode into and through the adjacent earth to the earth generally.

A further object of the invention is to provide a meter which will give satisfactory readings when the resistance of the reference electrodes is relatively high.

Figure 1:
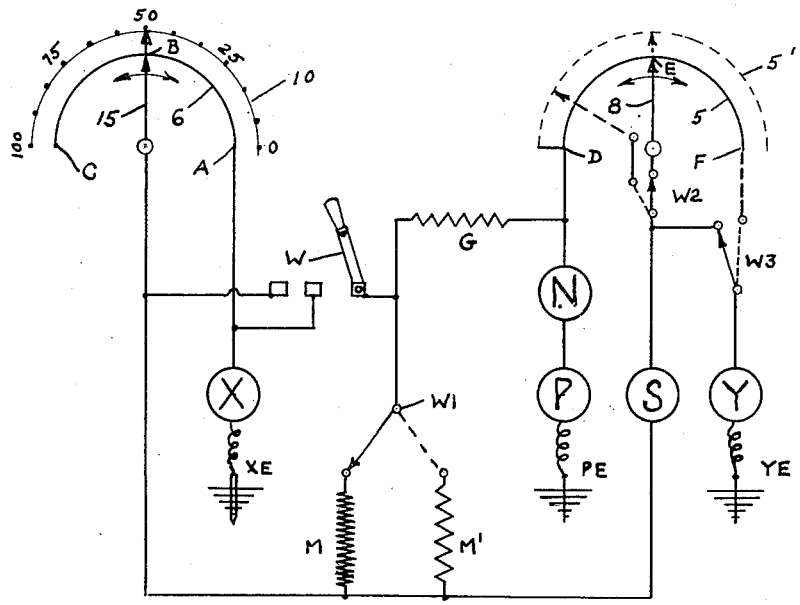
Figure 2:
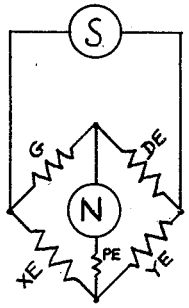
Figure 3:
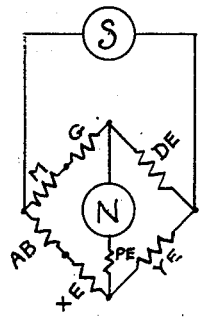
Figure 4:
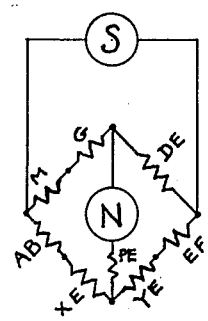

The drawing is schematic only and is intended to show the component parts and their arrangement (electrically) with respect to each other. Fig. 1 shows the arrangement of the parts for a complete meter. Fig. 2 is a simplified diagram of the connections when switch W is closed and Fig. 3 is a similar diagram when the switch is open. Fig. 4 is a diagram corresponding to Fig. 3 but with certain modifications.

Referring to Fig. 1, S indicates a source of current for operating the meter. N a null indicator. X, P and Y, binding posts which may be connected to three earth electrodes as XE, PE and YE. 6 is a variable resistance having a movable contact B operated by arm 15 which also operates a pointer over scale 10. 5 is a variable resistance having a sliding contact E operated by arm 8. 5' represents a second variable resistance which may be used selectively with resistance 5 by means of switch W2. W3 is a single pole double-throw switch by means of which binding post Y may be connected either to the end F of rheostat 5 or to the point E of rheostat 5. G is a fixed resistance and M and M' a multiplicity of resistances, any one of which may be selected by means of switch W1.

The purpose of the meter is to measure the resistance of the earth electrode XE and in order to do this it is necessary to use two reference electrodes as PE and YE, the three electrodes being connected to the three binding posts X, P and Y respectively.

Assuming switch W1, W2 and W3 to be in the positions shown by the full lines the operation of the meter is as follows: Switch W is closed which results in the formation of a bridge as shown in Fig. 2. Arm 8 is now adjusted until the null indicator indicates that the bridge is balanced when the following relationship will have been established, namely, G is to DE as XE is to YE. Now, without disturbing the position of arm 8, the switch W is opened which results in a bridge arrangement as shown by Fig. 3 and the bridge is now balanced by adjusting arm 15 when the following relationship will be established, namely, M+G is to DE as AB+XE is to YE. The only difference between the arrangement of Fig. 2 and Fig. 3 is that we have inserted the resistance M in one arm with resistance G, and in order therefore to restore the bridge balance we must insert a corresponding amount of resistance in the arm with resistance XE. If resistance M is equal to resistance G then resistance AB must be equal to resistance XE in order to restore the balance. If, however, instead of selecting resistance M we select M' and if M' has ten times the resistance of M then it is evident, therefore, that if scale 10 is direct reading with respect to the resistance ABC then the readings on scale 10 must be divided by ten in order to obtain the resistance of XE, from which it is evident that the various positions of switch W1 will indicate the multiplier or divider which must be applied to scale 10.

For constructing a meter for measuring electrodes of resistance values up to 1,000 ohms rheostat 6 may have a total resistance of 1,000 ohms and a scale calibrated from 0 to 100, resistance G 10 ohms, resistances M 100 ohms and M' 10 ohms, the corresponding multipliers for scale 10 being 1 and 10 respectively. Rheostat DEF may be about 5,000 ohms, 5' being 500 ohms etc.

The resistance of electrode XE may be anything from a fraction of an ohm to 1,000 ohms and the resistance of the reference electrode YE may be anything from a fraction of an ohm, as for instance when a city water main is used for the purpose, to several thousand ohms as for instance when a rod driven in very high resistance soil must be used for the purpose. The meter has certain limitations with respect to the permissible ratio between resistances XE and YE, one of which is that these resistances represent different arms of a bridge. For a relatively inexpensive type of meter I find that this ratio should not greatly exceed approximately 1 to 400.

Now if G is 10 ohms and we wish to have the meter operative when the ratio between XE and YE is 1 to 400 then rheostat DEF must be not less than 4,000 ohms and for practical purposes I select 5,000 ohms. If the rheostat consists of 1,000 turns of resistance wire wound on a bobbin then each turn will have a resistance of 5 ohms more or less or when we have 500 ohms in resistance DE one turn more or less will equal 1% and it is desirable that rheostat DEF be adjustable within 1% plus minus of a correct balance.

This in turn means that if the ratio between G and DE, or in other words between XE and YE, is less than 1 to 50 we cannot obtain a satisfactory balance on rheostat DEF if G is 10 ohms and DEF is 5,000 ohms. If now we substitute rheostat 5' of say 500 ohms it is apparent that the workable ratio will now become 1 to 5 instead of 1 to 50 and by utilizing additional rheostats we may reduce the ratio further but there are practical considerations why more than two rheostats are undesirable. When the ratio becomes less than 1 to 5 the switch W3 should be thrown to the dotted line position.

With the alternative method of Fig. 4 there is no possibility of difficulty from a low ratio of X to Y because the resistance of Y, and therefore the ratio, is automatically increased by the addition of resistance EF to YE as resistance DE is decreased. For instance, if XE and YE were each 1 ohm then the bridge would balance for Fig. 2 when DE is approximately 10 times EF. If XE be 10 ohms and YE 1 ohm we have a balance when DE and EF are nearly equal. If XE be say 490 ohms and YE 1 ohm then we will have a balance with approximately 100 ohms in DE and 4,900 in EF.

From the foregoing it will be seen that in general the method of Fig. 3 is preferable when YE is greater than XE and that the method of Fig. 4 is preferable when XE is greater than YE and since both conditions are encountered in practice is is desirable to have a meter which is easily adaptable to either arrangement.

It is of course to be understood that S and N are interchangeable, this being a characteristic of all such bridge arrangements. It is evident that M may be a variable resistance provided with a scale, AB then becoming one or more fixed resistances.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:—

1. In a meter for measuring the resistance of an electrode as XE, the combination with the electrode XE of a second electrode YE, a third electrode PE, a source of current, a null indicator, a variable resistance DEF divisible into two parts DE and EF, a part AB of an adjustable resistance ABC, a fixed resistance G, a fixed resistance M, electrical conductors and switching mechanism operable to connect the before-mentioned members, except EF, in such manner as to form a Wheatstone bridge containing four arms connected in closed series, the first arm containing resistance DE, the second arm containing electrode YE, the third arm containing electrode XE, and the fourth arm containing electrode G; with the source of current connected between two diagonals of the bridge and the null indicator connected between the other two diagonals; and also operable to connect the parts in such manner as to form a Wheatstone bridge containing four arms connected in closed series, the first arm containing the resistances M and G in series, the second arm containing resistance DE, the third arm containng electrode YE, and the fourth arm containing electrode XE and resistance AB in series; with the source of current connected between two diagonals of the bridge and the null indicator connected between the other two diagonals.

2. Means for measuring the resistance of an earth electrode as XE which includes; two earth electrodes YE and XE, a part AB of a variable resistance ABC, a fixed resistance M, a fixed resistance G, and a variable resistance DEF divided into two parts DE and EF so that DE is to G as EF+YE is to XE, all connected by four junction points into a closed series circuit containing four arms the circuit running through an arm consisting of the resistances M and G in series, thence through an arm consisting of resistance DE, thence through an arm consisting of resistance EF and earth electrode YE in series, thence through an arm consisting of earth electrode XE and resistance AB in series and thence to the point of beginning, all in combination with a source of current connected between two junction points which are separated from each other by two arms and a null detector connected between the other two junction points.

3. A meter according to claim 1 characterized by the fact that the resistances B and M are transposed.

4. A meter according to claim 1 characterized by the fact that resistance DEF is a multiplicity of variable resistances any one of which may be selectively chosen by switching means associated therewith.

5. A meter according to claim 1 characterized by the fact that resistance M is a multiplicity of resistances any one of which may be selectively chosen by switching means associated therewith.

STEPHEN W. BORDEN.